United States Patent

Inagaki

[11] Patent Number: 5,098,732
[45] Date of Patent: Mar. 24, 1992

[54] MANUFACTURING METHOD FOR ICE-CREAM PRODUCTS AND ITS APPARATUS FOR THE SAME

[76] Inventor: Jitsuo Inagaki, 71, Aza Kamiyashiki, Oaza Itsusiki, Itsusikicho Hazugun, Aichi, Japan

[21] Appl. No.: 711,385

[22] Filed: Jun. 6, 1991

Related U.S. Application Data

[63] Continuation of Ser. No. 526,699, May 16, 1990, abandoned, which is a continuation of Ser. No. 317,755, Mar. 2, 1989, abandoned.

[51] Int. Cl.$^5$ .......................... A23G 9/10; A23G 9/20
[52] U.S. Cl. ................................... 426/565; 426/524; 426/312; 426/319; 426/393
[58] Field of Search ............... 426/565, 524, 312, 393, 426/319; 99/473

[56] References Cited

U.S. PATENT DOCUMENTS

| | | | |
|---|---|---|---|
| 695,330 | 3/1902 | McCaslin | 99/473 |
| 1,414,214 | 4/1922 | Sanna | 426/565 |
| 1,485,069 | 2/1924 | Burt | 426/565 |
| 2,374,425 | 4/1925 | Weerth | 99/473 |
| 2,909,433 | 10/1959 | Morrison | 426/524 |
| 4,027,045 | 5/1977 | Fedotkin et al. | 426/312 |
| 4,478,861 | 10/1984 | Montgomery et al. | 426/524 |
| 4,619,116 | 10/1986 | Cristante | 426/565 |

Primary Examiner—Jeanette Hunter
Attorney, Agent, or Firm—Armstrong, Nikaido, Marmelstein, Kubovcik & Murray

[57] ABSTRACT

A method for making ice-cream products by preparing a mixture of the bulk material for ice-cream, filling it into a container and applying thereto a liquid nitrogen or a liquid nitrogen-based gas while said bulk is agitated.

2 Claims, 4 Drawing Sheets

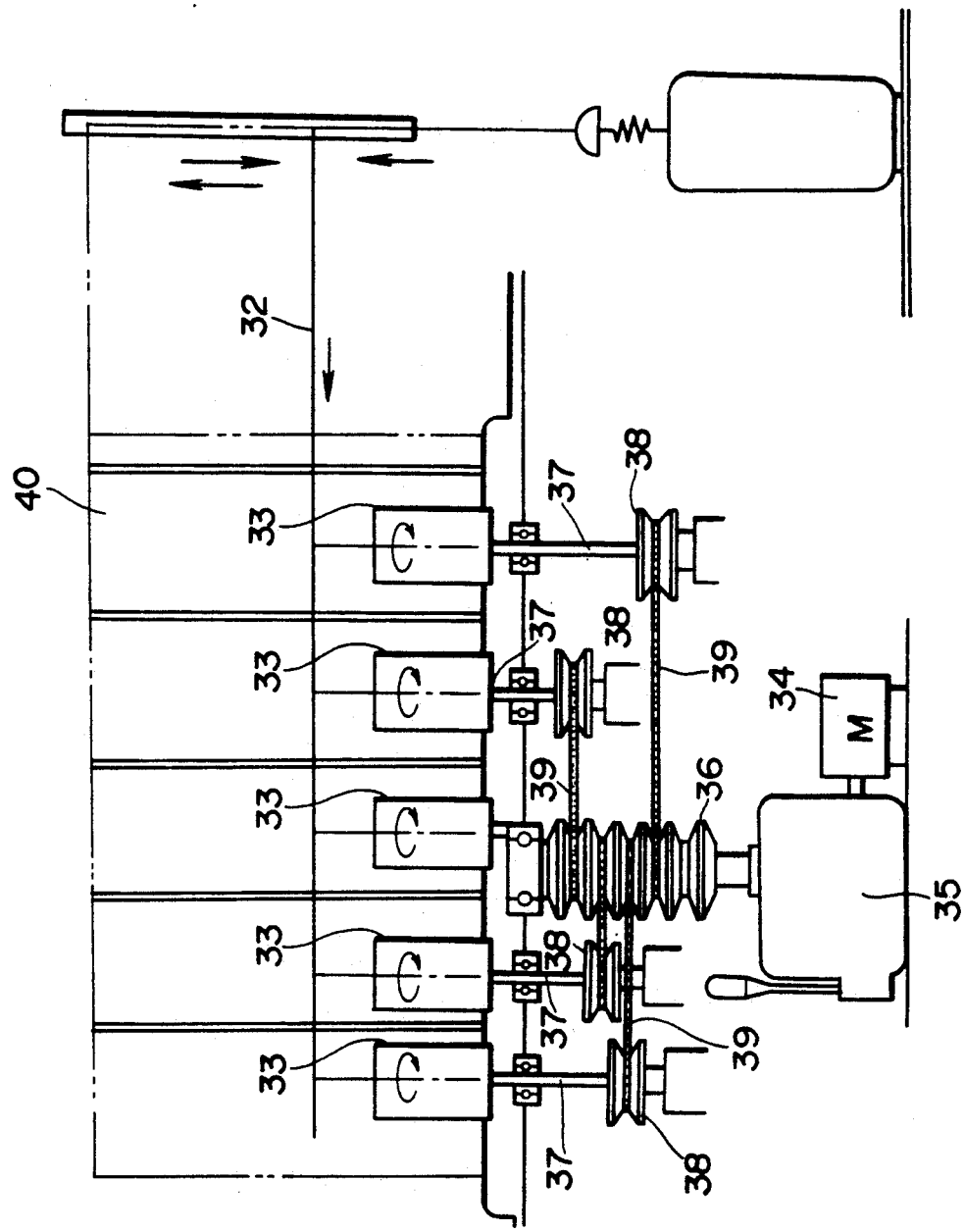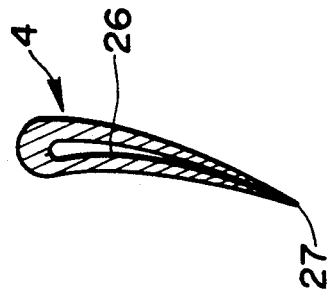

MANUFACTURING METHOD FOR ICE-CREAM PRODUCTS AND ITS APPARATUS FOR THE SAME

This application is a continuation of application Ser. No. 526,699 filed May 16, 1990 which is a continuation of application Ser. No. 317,755 filed on Mar. 2, 1989 both now abandoned.

BACKGROUND OF THE INVENTION

The present invention relates to a manufacturing method for ice-cream products and an apparatus for the same which enables a consumer to select and nominate the material the ice-cream products depending on the favorite taste of an individual at a shop.

Ice-cream is known and is a favorite preference of thousands of people as a chilled products prepared by mixing ingredients such as milk, dairy products, sugar, emulsifying agents, stabilizers, colorants, flavoring agents, chocolate, coffee, nuts, fruit juice, and fruits, chilling during agitation, and then freezing in a form.

Since most of the ice-cream sold at a cafe or an ice-cream shop is supplied from a big batch from bulk production, there are many restriction of kinds thereof, and thus, the prefence and favorite flavor of an individual consumer is not accommodated even though ice-cream itself is a delightful selective product with many kinds of flavor variations.

SUMMARY OF INVENTION

It is an object of this invention to provide a manufacturing method for ice-cream products and an apparatus for the same, of which ice-cream can be occasionally and readily supplied to an individual consumer depending on the favorite flavor of such individual at a cafe or an ice-cream shop.

It is another object of this invention to provide a manufacturing method and apparatus for ice-cream products which can produce these products in a very short time.

It is another object of this invention to provide a manufacturing method and apparatus for ice-cream products which help prevent oxidization of such produced ice-cream and deterioration of taste or flavor thereof.

The foregoing objects and other objects as well as the characteristics features of this invention will become readily apparent from the following description when taken in conjunction with accompanying drawings.

BRIEF DESCRIPTION OF THE DRAWINGS

FIG. 3 is a sectional view taken along the line III—III in FIG. 2.

FIG. 4 is a general assembly view showing another embodiment of an apparatus of this invention.

DESCRIPTION OF THE PREFERRED EMBODIMENTS

In order to achieve the foregoing objects of this invention, the inventor paid his attention, after enthusiastic studies, to the fact that the conventional manufacturing method for ice-cream required a long cooling time such that the products could not be produced and supplied occasionally and readily in a short period of time. He reached this invention through finding that ice-cream can be produced in a extremely short time by cooling by means of the introduction of liquid nitrogen directly into the material bulk of ice-cream to be manufactured or by the introduction of liquid nitrogen gas thereto. According to one feature of this invention, the material bulk of ice-cream to be produced is prepared by mixing after selection by an individual in accordance with his preference, which then is filled into a container wherein a liquid nitrogen or a liquid nitrogen based gas is introduced and the bulk chilled while it is agitated.

According to another feature of this invention, a container for producing ice-cream is rotatable; a driving force in its lower portion, and a cooling whirl in a form of hollow disposed in its interior and provided with a plurality of discharge orifices for applying a liquid nitrogen or a liquid nitrogen based gas.

According to another feature of this invention, a manufacturing method and apparatus for ice-cream products comprises a container for producing ice-cream, an agitation wheel disposed in said container and a plurality of discharge orifices for applying a liquid nitrogen or a liquid nitrogen base gas.

It should be understood from this invention that liquid nitrogen itself may be applied to the material bulk to produce ice-cream, or a liquid nitrogen based gas such as those which are air mixed and of a temperature appropriately controlled may also be employed. However, the employment of liquid nitrogen itself if preferable to the extent that it will prevent oxidization of the ice-cream and deterioration the taste or flavor thereof without using any anti-oxidized agents.

As used herein, the terms "ice-cream" or "ice-cream products" shall be all inclusive and include, for example, conventional ice-cream, sherbet and soft ice-cream.

Preferred embodiments of this invention will be described in detail with reference to the accompanying drawings.

Figure 1:
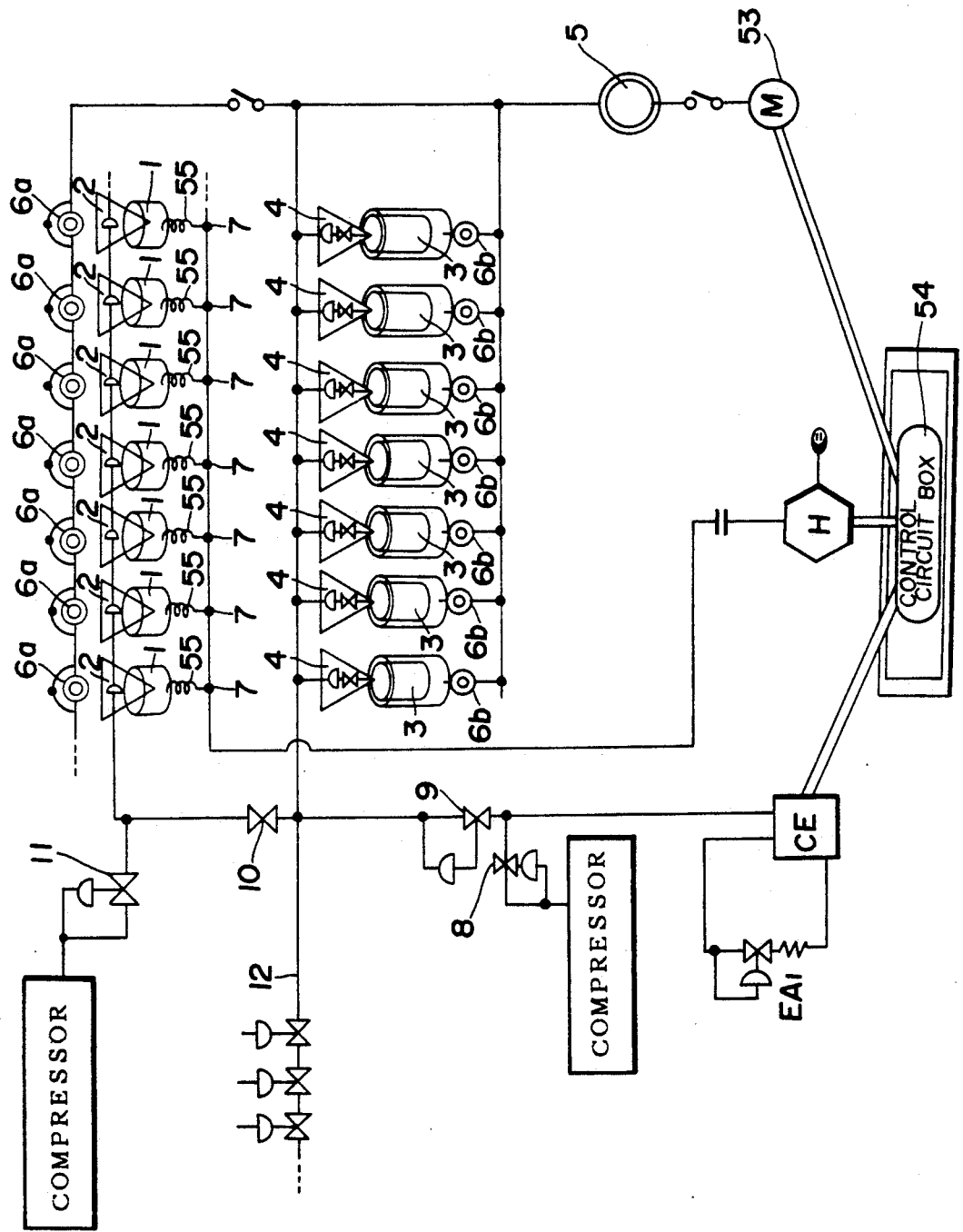
FIG. 1 is a distribution diagram showing an embodiment of this invention.

FIG. 1 shows a distribution diagram for manufacturing ice-cream according to this invention in which the material bulk selected by a consumer is filled into a container 1, where the material bulk is mixedly agitated homogeneously by agitation wheel 2, and then the container is properly heated for pasteurization of the material. Consequently, a mixing gas of liquid nitrogen and air controlled to a temperature in the range of about $-1° \sim -10°$ C. is sprayed into the container 1 through a plurality of discharge orifices communicating with a hollow portion inside the agitation wheel, and thus the material bulk is prepared by chilling at reasonable temperature. Such prepared material bulk for ice-cream is filled into a cooling container 3, and a mixing gas of a liquid nitrogen and air controlled to a temperature of $-100° \sim -200°$ C. is introduced into the cooling container which is rotated, and then the material bulk is chilled and frozen while the bulk is mixedly agitated, and thus high quality ice-cream is obtained. The so produced ice-cream is supplied to the consumer with some sauce poured on if so desired. Driving force of motor 53 is controlled through control circuit box 54 which is connected to a transmission 5 to have first control of the entire rotation for the agitation wheels 2 and the cooling containers 3. Transmissions 6a are provided at each of agitation wheels 2 and transmissions 6b are provided at each of cooling containers 3 to serve as a second control of the respective rotation of agitation wheels and cooling containers. By these provisions, one advantage will be realized that respective rotating motion or speed for each agitation wheel 2 or cooling container 3 is independently variable and can be properly set depending upon the requested kind or flavor of the ice-cream. In the process of the material bulk preparation, the heating of the container is accomplished by each heater respectively set at required temperature by means of control system 7 consisting of a sensor and a switch controlled via control circuit box 54.

A liquid nitrogen gas is introduced into the pressurized evaporator $EA_1$, where the gas is gasified and adjusted to a reasonable degree and temperature by the self-pressure valve to have a mixing with air which is then compressed by a compressor where controlled at reasonable pressure equivalent to a liquid nitrogen gas by reducing valve 8. The mixing gas is adjusted to a reasonable degree of pressure to spray into a cooling container 3 through discharge orifices of cooling whirl 4.

The mixing gas us again adjusted to a reasonable degree of pressure by secondary adjustable valve 10 to have a mixing with air which is compressed by a compressor where controlled at reasonable pressure equivalent to a liquid nitrogen gas by reducing valve 11. The mixing gas is sprayed out into container 1 through discharge orifices of the agitation wheel.

In the above mentioned embodiment, liquid nitrogen gas is supplied from the cooling source of a freezer for storage of ice-cream, a refrigerator for storage of various material and a refrigerating show-case for fruits and wines, via bypass 12.

Figure 2:
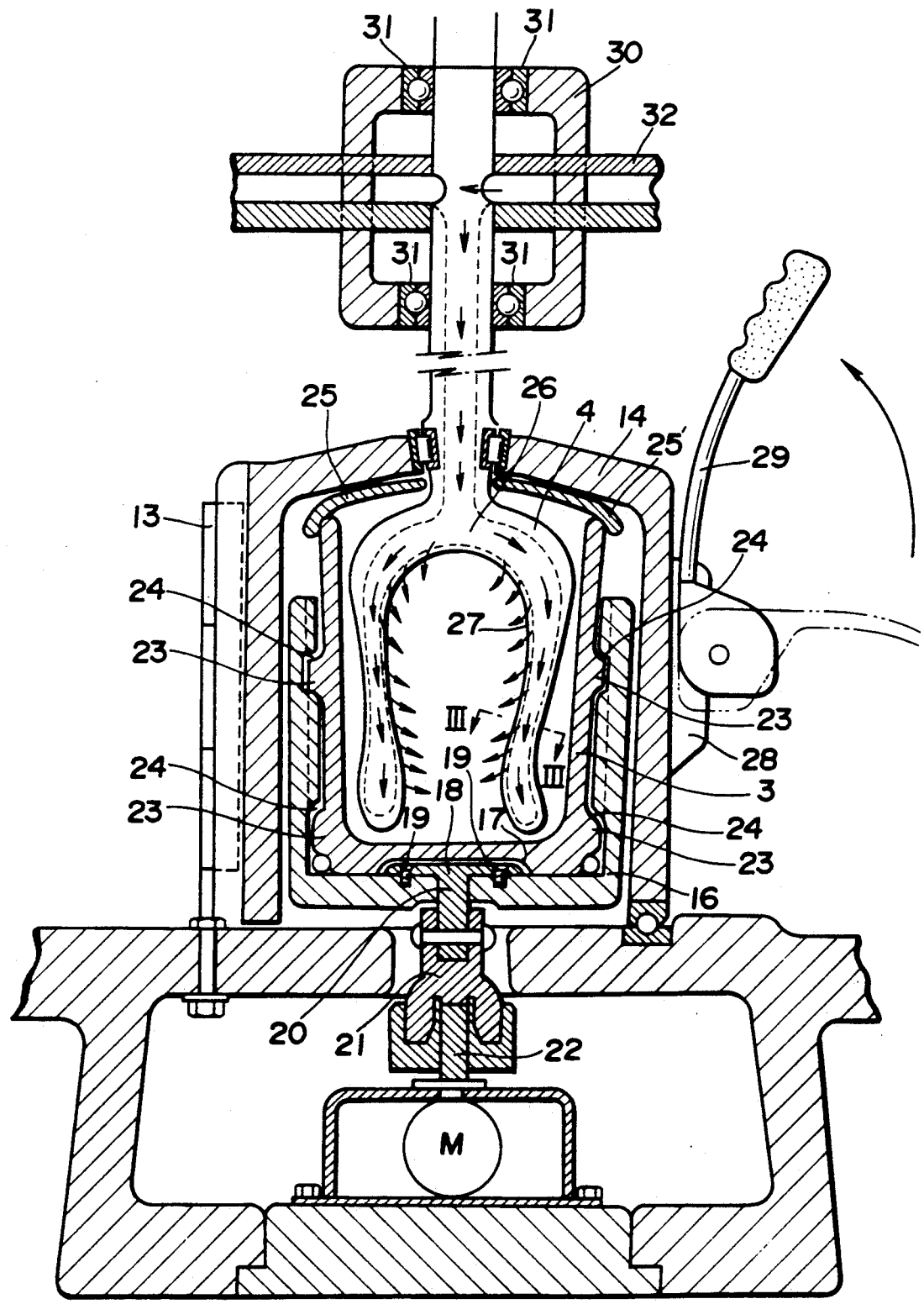
FIG. 2 is a cross-sectional view showing an embodiment of an apparatus of this invention.

FIG. 2 shows an embodiment of a manufacturing apparatus for ice-cream of this invention, comprising a housing 14 which is openable along an axis of hinge 13 at one end, a heat-isolating container 16 made of ceramic which is interposed between said housing 14 and a cooling container 3 made of ceramic and rotatable by a driving source provided beneath, and a cooling whirl 4 which is disposed within said cooling container 3.

A cross shaped groove 17 is provided in a bottom of the heat-isolating container 16 to fixedly engage with a top end 18 of a cross shaped metal connector 20 by the threads 19. The shaft of the connector 20 extends through heat-isolating container 16 to engage with a groove of a rubber connector 21 on its top end, and the rubber connector is secured with a driving shaft 22 of a motor.

Convexes 23 are formed on the central portion and lower portion of the outer circumference of the cooling container 3 to engage with the circular concaves 24 which are formed on inner circumference of the heat-isolating container 16 in manner having an upward taper on the engaged surface toward the convexes and the rotating direction. Two vertical grooves are formed extending beyond said circular concaves 24 in a crosswise direction in inner. The circumference of the heat-isolating container 16 for the purpose to remove the cooling container 3 from the heat-isolating container 16 at an orientation through said grooves.

Two semicircular closure 25, 25' are mounted on the top of the cooling container 3 to be removable by separation of the two when the cooling whirl 4 is elevated upwardly. The cooling whirl 4 is disposed in the cooling container 3 so as to be elevationally movable, and the inside of the whirl is formed in a hollow shape and provided a plurality of discharge orifices 27 on the outer circumference thereof to communicate with said hollow portion to spray the gas. As shown in FIG. 3, a cross section of the cooling whirl 4 is formed in a streamline shape toward the inward thereof, and is provided with a gas discharge orifice 27 on top of the sharp edge thereof. Turning back to FIG. 2, the housing 14 is formed in a split cylindrical body which is operable with an axis of hinge 13 at one end, and a flange 28 is integrally formed on an opposed end of each split body a lever 29 is secured to flange 28 so as to be able to fixedly shut the split bodies when said lever is left up, and to be able to release such shut down for opening such bodies when said lever is left down. On the upper portion of the shaft of the cooling whirl, square shaped shaft retaining member 30 is provided through bearings 31 to retain the shaft rotatable and elevationally movable, and distribution pipe 32 is connected across the shaft. The mixing gas of a liquid nitrogen and air is introduced, as indicated by the arrow direction in FIG. 2, from said distribution pipe 32 through the passageway of the inside hollow portion of the shaft into the cooling container 3 to be sprayed out from each discharge orifice 27 of the cooling whirl 4. Another embodiment of this invention is shown in FIG. 4 wherein the rotating motion of a plurality of containers for producing ice-cream is provided by a pulley from a motor driving force.

An automatic transmission 35 linked with a motor 34 is interlinked with a pulley 36 which provides a plurality of whorls of which number correspond to the number of containers to be rotated by a belt driving, and which is interlinked with each pulley 38 interlocked through a belt by a rotation shaft of a container on the bottom.

The rotation speed of each container may be controlled by a individual transmission directly or adjusted by changing size of pulley to be driven by belt. As shown in this embodiment, the distribution pipe 32 for mixing gas is always engaged with a cooling whirl as a unit with this structure, and thus both can be simultaneously movable in elevation. When it is not necessary to use a cooling whirl, they can be stored in a cabinet 40 provided in the upper portion as shown in FIG. 4.

Figure 5:
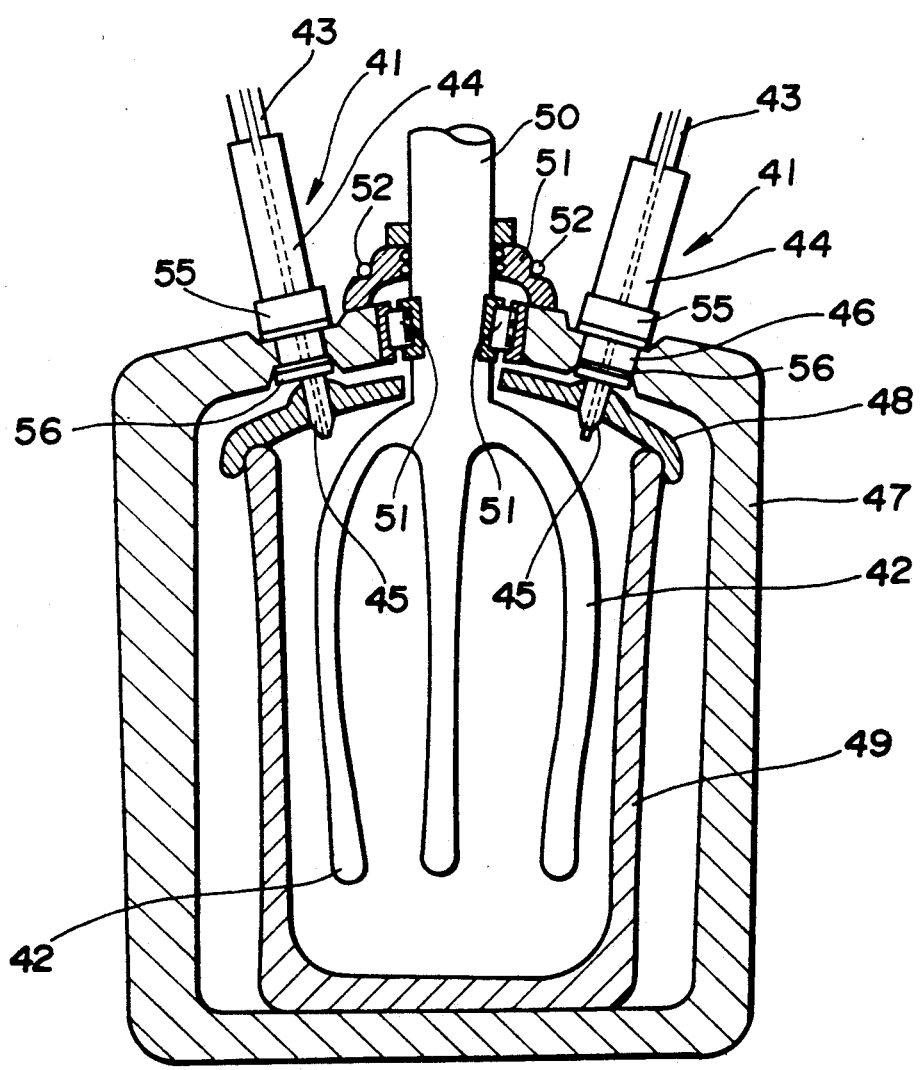
FIG. 5 is a sectional view showing another embodiment of an apparatus of this invention.

FIG. 5 shows another embodiment of this invention, wherein a pair of insertion nozzles 41 for mixing gas discharge are disposed in a crosswise orientation facing each other, and the agitation wheel is driven by a motor. The nozzle 45 is connected with a flexible pipe 43 through connector 44. The flexible pipe 43 is linked with a distribution pipe, and is threaded with the housing 47 by thread at the outside, and the top end thereof is extended to the inside of container 49 through closure 48 of a cooling container. Numerals 55, 56 in FIG. 5 represent fastening nuts by which insertion nozzle 41 is fixedly retained. Shaft 50 of the agitation wheel 42 is retained by the housing 47 through roller bearings 51. On the upper surface of such engaging portion for shaft 50, sealing lip 51 is provided by a spring 52 mounted around so as to airtightly seal the shaft. According to this embodiment, finished ice-cream can be taken out by means of either an elevational motion of the agitation wheel or movement of the container to the contrary.

According to this invention as described above, any consumer can select and nominate his preferred material, and then the ice-cream can be supplied occasionally and readily in accordance with the favorite preference of an individual. Therefore, not only is the consumer delighted with an enjoyable variation of the ice-cream, but also the seller can always supply the exact ice-cream that the consumer really desires.

What is claimed is:

1. A method for manufacturing ice-cream products comprising, preparing a quantity of a fruit-containing mixture of bulk material for ice-cream selected by an individual in accordance with his preference, filling the mixture into a cooling container having agitation means including a cooling whirl projecting into the container and having a large number of discharge orifices, and means for rotating the container, the cooling whirl being fixed relative to the rotating cooling container, and agitating the mixture in the cooling container by rotating the container and cooling the container agitation means by applying thereto a liquid nitrogen or a liquid nitrogen based gas in jet streams through the large number of discharge orifices located in said cooling whirl so as to cool and substantially instantaneously freeze the entire quantity of fruit containing mixture of the bulk material.

2. A method for manufacturing ice-cream products according to claim 1 wherein the means for rotating the container includes a motor having a shaft coupled to the lower end of the cooling container.

* * * * *